July 6, 1948.　　　　E. J. ISBISTER　　　　2,444,445
RADIO NAVIGATION SYSTEM
Filed Nov. 10, 1943
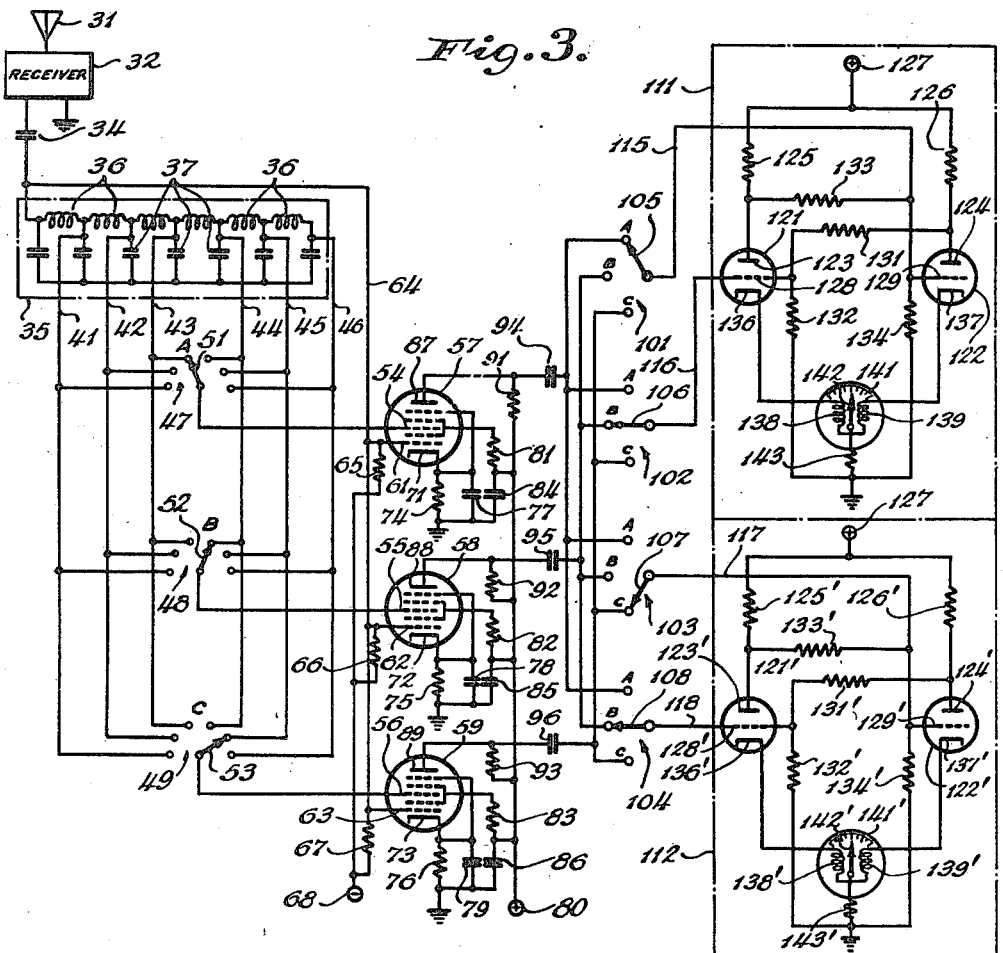
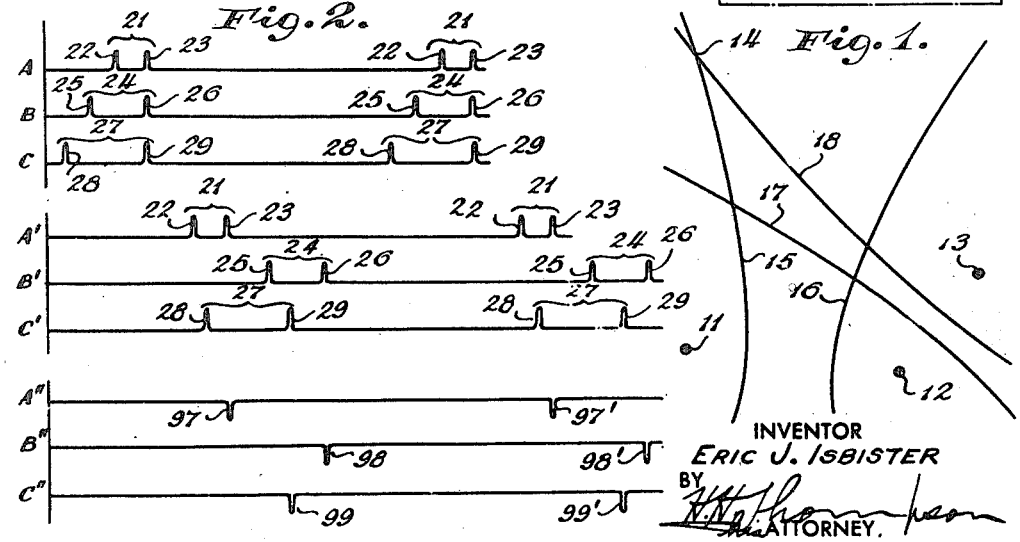
INVENTOR
ERIC J. ISBISTER
BY
ATTORNEY.

Patented July 6, 1948

2,444,445

UNITED STATES PATENT OFFICE 2,444,445

RADIO NAVIGATION SYSTEM

Eric J. Isbister, Garden City, N. Y., assignor to The Sperry Corporation, a corporation of Delaware Application November 10, 1943, Serial No. 509,666

14 Claims. (Cl. 343—103)

This invention relates, generally, to a radio navigation system in which the position of a craft is fixed by the intersection of hyperbolas, each of which represents the path of a point that maintains a constant difference in its distance from two fixed points. In a navigation system of this type the distance difference may be determined by measuring the time intervals between the arrival at the craft of signals synchronously transmitted from separate stations of known location.

The present invention particularly concerns receiving apparatus for use in such systems, whereby a measure of the difference in the distances of the receiver from two transmitting stations is automatically provided and the hyperbolas may thus be readily identified for fixing the position of the receiver.

The major object of the invention is to provide a radio navigation system for mobile craft having receiving apparatus for automatically determining data to readily fix the position of said craft.

Another object of the invention is to provide a radio navigation system for mobile craft having apparatus for automatically determining the difference in the distances between the craft and separated transmitting stations.

Still another object of the invention is to provide receiving apparatus in a radio navigation system, having means for automatically identifying and segregating signals from two separate stations.

A further object of the invention is to provide a radio navigation system having a receiving apparatus for segregating signals received from separated transmitting stations and automatically measuring the time interval between the reception of energy from said stations.

A still further object of the invention is to provide a radio navigation system having a receiver for segregating signals received from separated transmitting stations, and automatically indicating the difference in the distances of the receiver from said stations to identify hyperbolas whose intersection fixes the position of said receiver.

Other objects and advantages of the invention will become apparent in the following specification, taken in connection with the accompanying drawings in which Fig. 1 is a diagram showing the relative positions of three transmitting stations to provide a clearer understanding of a radio navigation system embodying the present invention;

Fig. 2 is a diagram showing the time phase relationship of various signals in the system for convenience in explaining the operation of the invention, and Fig. 3 is a schematic diagram of a receiver embodying the invention in its preferred form.

According to the invention signals are periodically transmitted from several separated stations in synchronized relation, and a receiver detects the signals from several stations. The detected signals of each station are identified and segregated from other received signals by selectors which are connected in certain pairs, to measuring devices for determining the time interval between the reception of signals from each of said pair of stations. The time intervals between the arrival at the craft of signals from the separate transmitting stations are automatically measured and represent a measure of the difference in the distances of the craft from the transmitting stations in each pair. By supplying signals from at least two different pairs of transmitting stations to the measuring devices, it is possible to locate the craft on two hyperbolas whose intersection determines the position of the craft.

As shown in Fig. 1, three transmitting stations 11, 12, and 13 may be employed to synchronously transmit signals to be used by the various mobile craft for fixing their respective positions. As is well known, the path of the point that has a constant difference in its distance from two fixed points describes a hyperbola. The three transmitters 11, 12 and 13 may be arranged in pairs to represent the foci of families of hyperbolas. Every position of the craft may be determined by the intersection of two branches of the hyperbolas of each family.

For purposes of illustration, it is assumed that the craft is located at the point 14. The difference in the distances of the point 14 from the stations 11 and 12 locates the craft on a hyperbola having branches 15 and 16. Similarly, the difference in the distances of the point 14 from stations 12 and 13 locates the craft on a hyperbola having branches 17 and 18. The particular branches of the hyperbolas on which the craft is located may be readily determined by ascertaining which station is the nearer. Since the point 14 is nearer to station 11 than station 12 it is obviously located on the branch 15 of the hyperbola, and likewise, since it is nearer station 13 than station 12 it is located on branch 18 of the hyperbola.

Obviously, a map may be constructed showing a plurality of hyperbolas drawn with the stations 11 and 12, and 12 and 13 as foci with their branches arranged in convenient increments to cover a desired range of distance differences. By determining the particular hyperbola of each family on which the unknown position of the craft is located and identifying the correct branch of each hyperbola, it is possible to fix the absolute position of the craft by locating the intersection of the hyperbolas' branches on the map.

The three transmitters located at stations 11, 12 and 13, periodically transmit a group of short pulses of radiant energy. The three stations are synchronized so the groups of pulses radiated from each station have the same period. However, the time spacing of the pulses in each group is different for each station.

One arrangement of the synchronized pulses is shown in the time chart in Fig. 2 where the groups of pulses radiated by stations 11, 12 and 13 are shown at A, B, and C, respectively. The pulses of energy from station 11, as shown in Fig. 2A, include groups 21, 21 composed of first and second pulses 22 and 23, respectively; the pulses from station 12 include groups 24, 24 composed of first and second pulses 25 and 26, respectively, and the energy radiated by station 13 includes groups of pulses 27, 27 composed of first and second pulses 28 and 29 respectively. The second pulse of each group is shown as being radiated simultaneously by all three stations. Since the spacing between the two pulses in each group is different for each station, the first pulse appears at different times for the respective stations. In this case, the synchronism of the groups radiated is determined by the second pulse. Although the second pulses are shown as being radiated simultaneously by all of the stations, they may be radiated at any known time intervals from the various stations.

Since the distance of the craft determines the time required for energy to travel from the transmitting stations to the craft, it will be apparent that the difference in the distances of the craft from the transmitting stations corresponds to the time interval between the reception of pulses from said stations provided the pulses are radiated simultaneously. If they are not radiated simultaneously, allowance may be made for the known time interval between the radiation of the pulse groups by the several stations.

Considering for the moment only the second pulses 23, 26 and 29 radiated simultaneously by the stations 11, 12 and 13 respectively, it will be apparent that the time elapsing between reception of these pulses at the location of the craft will provide a measure of the difference in the distances of the craft from said stations, thereby locating the craft on hyperbolas. In order to determine on which branches of the hyperbolas the craft is located it is necessary to determine which transmitting station is nearer to the craft, that is, which pulse is received first. Unless the first received pulse can be identified there are obviously several intersections of the branches of the hyperbolas which could represent the position of the craft.

By the present invention, the spacing of the various groups of received pulses is used to identify the pulses received from each station and to segregate them from other received signals. When this is done it is possible to supply pulses from selected stations to a measuring device providing a measure of the time interval between the reception of the pulses from each station and also indicating which of the pulses is first received.

Although Fig. 1 shows only two hyperbolas, it will be apparent that a third hyperbola, having stations 11 and 13 as foci, may be used to check the position fixed by the intersection of the other two hyperbolas.

The receiving apparatus shown in Fig. 3 embodies the invention in its preferred form. Pulses of energy from the transmitting stations 11, 12 and 13 are collected by an antenna 31 and supplied to a receiver 32 which may detect the pulses received from all three stations. Since the craft is located at point 14 the pulses from the various stations will be collected by the antenna 31 at different times, depending upon the time intervals required for them to travel from the transmitting stations to the craft. The time relation of the received pulses is shown at A', B' and C' in Fig. 2. The time interval between the reception of the second pulses 23, 26 and 29, as shown at A', B' and C' in Fig. 2, provides a measure of the difference in the distances of the point 14 from the three transmitting stations 11, 12 and 13.

The output of the receiver 32 is connected as by a condenser 34 to a delay network 35 which may be formed of a section of artificial transmission line having appropriate inductive and capacitive elements 36 and 37 respectively. The delay network is provided with suitable taps as represented by leads 41, 42, 43, 44, 45 and 46, for providing different time delay of received energy. These taps are connected to contacts of switches 47, 48 and 49 having contactors 51, 52 and 53 settable to pick up signals detected by the receiver 32 and delayed for predetermined time intervals by the delay network 35.

The contactors 51, 52 and 53 are each connected to control grids 54, 55 and 56 of selector tubes 57, 58 and 59 which may be of the pentagrid type. The other control grids 61, 62, and 63 of the respective selector tubes are connected directly as by lead 64 to the receiver 32.

The selector tubes 57, 58 and 59 are arranged in circuits which are sometimes referred to as coincidence selector circuits. It should be understood, however, that other types of selector circuits may be used without departing from the invention. Each of the selector circuits for tubes 57, 58 and 59 are identical, with the exception of the input circuits for supplying signals to the control grids 54, 55 and 56, as will subsequently be explained.

Control grids 61, 62 and 63 are connected through resistors 65, 66 and 67 to a source 68 of negative potential which provides a sufficient bias to normally cut off the selector tubes 57, 58 and 59. Cathodes 71, 72 and 73 of the selector tubes 57, 58 and 59 are connected through suitable cathode resistors 74, 75 and 76 which are shunted in a conventional manner by by-pass condensers 77, 78 and 79. The screen grids of the tubes are connected through dropping resistors 81, 82 and 83 to a source 80 of positive potential and are also connected through by-pass condensers 84, 85 and 86 to ground. The suppressor grids of each of the selector tubes 57, 58 and 59 are connected directly to their respective cathodes.

Plates 87, 88 and 89 are connected through load resistors 91, 92 and 93 to the source 80 of positive potential. The outputs of the tubes 57, 58 and 59 appearing across the load resistors 91, 92 and 93 are coupled as by condensers 94, 95 and 96 to the contacts of switches 101, 102, 103, and 104, having settable contactors 105, 106, 107 and 108 for optionally supplying the outputs of any pair of the selector tubes to a pair of devices 111, 112. The devices 111 and 112 provide a measure of the time interval between the reception of pulses from each of the stations as well as an indication as to which pulse is first received which corresponds to the difference in the distances of the receiver from the respective transmitting stations.

The taps of the delay network 35 may be arranged to correspond to the time spacing of the pulses in each group radiated by selected transmitting stations. For example, the tap represented by lead 43 may be arranged in the delay network 35 so energy from the receiver 32 is delayed by a time interval corresponding to the time between the radiation of first and second pulses 22 and 23 of the group 2 transmitted by station 11. This delay causes the first pulse 22 to appear on the lead 43 at the same instant as the second pulse 23 appears on the lead 64.

If the settable contactor 51 of the switch 47 is connected to the lead 43 it will supply the first pulse 22 to the control grid 54 of the selector tube 57, at the same instant as the second pulse 23 is supplied by the lead 64 to the control grid 61. The source 68 of negative potential is so selected that the selector tube 57 is normally biased to cut off and will pass current through its plate circuit, when positive pulses appear simultaneously on the two grids 54 and 61.

In the event the second pulses are not transmitted simultaneously, the connections to the control grids 61, 62 and 63 may include delay network to delay pulses applied to one or more of them according to the time between transmission of groups of pulses by the respective stations. In this case, the taps of delay network 35 will be adjusted to allow for the same time interval so first and second pulses from each station will be applied simultaneously to two grids of one of the selector tubes.

It will be apparent from this description of the circuit for selector tube 57 that an output signal will appear across load resistor 91 only when pulses are detected by the receiver 32 which have a time spacing corresponding to the delay interval determined by the tap in delay network 35, which is connected to the control grid 54. In the present case this delay interval corresponds to the time interval between the radiation of the first and second pulses 22 and 23 by the transmitting station 11. Any pulses or other signals having a different time phase relation, which may be collected by antenna 31 and detected by receiver 32, will be applied at different times to the control grids 54 and 61, hence they will not produce an output signal as represented by the flow of current in the circuit of tube 87 through load resistor 91.

In a corresponding manner the control grids 55 and 56 of the selector tubes 58 and 59 may be connected by appropriately setting contactors 52 and 53 of switches 48 and 49 to taps of the delay network 35, which represent a delay interval corresponding to the time interval between first and second pulses 25 and 26, radiated by transmitting station 12, and first and second pulses 28 and 29 radiated by transmitting station 13. As shown in the drawings the taps of the delay network 35 having delay intervals corresponding to the time interval between the spacing of the pulses in the groups radiated by stations 12 and 13 are represented by leads 44 and 45. Since the contactor 52 is set to connect the control grid 55 of selector tube 58 to the lead 44, current flows in the circuit of plate 89 and through the load resistor 92 to provide an output signal only in response to the reception of pulses having a time spacing corresponding to the first and second pulses 25 and 26 radiated by the transmitting station 12. Hence an output signal from the tube 58 is produced only in response to the reception of pulses from transmitting station 12.

Similarly, the connection of control grid 56 of selector tube 59 by the contactor 53 to lead 45 will cause an output signal to appear across load resistor 93 in the circuit of plate 89 only in response to the reception of pulses spaced according to the spacing of first and second pulses 98 and 99 from the transmitting station 13.

In this manner the output of each of the selector tubes is caused by the simultaneous application of the second pulse directly from receiver 32 to one control grid and the first pulse delayed by the network 35 to coincide with the second pulse. Therefore, the output signal from the selector tubes corresponds in time to the reception of second pulses from the transmitting stations 11, 12 and 13 by the receiver 32.

The contactors 105 and 106 of the switches 101 and 102 are connected as by leads 115 and 116 to supply output signals from any two of the selector tubes to measuring device 111. Similarly, contactors 107 and 108 of the switches 103 and 104 are connected as by leads 117 and 118 for supplying output signals from a different pair of the selector tubes, according to the setting of the contactors 107 and 108 to the measuring device 112.

The measuring devices 111 and 112 are identical, so a description of the circuit of one of them will suffice for both. The same reference numerals have been applied to corresponding elements of both circuits.

These measuring devices each include a pair of tubes 121 and 122, and are arranged in a switching circuit similar to that sometimes referred to as an Eccles-Jordan circuit. Plates 123 and 124 of the tubes 121 and 122 are connected through resistors 125 and 126 to a suitable source 127 of positive potential. Grid 128 of the tube 121 is connected through resistor 131 to plate 124 and through a resistor 132 to ground. In this manner a selected portion of the voltage of plate 124 is applied to the grid 128.

Similarly, grid 129 of the tube 122 is connected through a resistor 133 to the plate 123 and through a resistor 134 to ground, whereby a portion, depending upon the ratio of resistors 131 and 134, of the voltage of the plate 123 is applied to the grid 129. Cathodes 136 and 137 of the tubes 121 and 122 are connected through windings 138 and 139 of a differential meter 141 having a pointer 142 which is deflected according to the difference in the currents through the windings 138 and 139. The circuits of the cathodes 136 and 137 are both completed from the windings of the meter 141 through a cathode bias resistor 143 to ground.

When one of the tubes 121 or 122 is conducting current, the other tube is cut off. For example, if tube 121 is conducting its plate voltage drops to a point where the potential applied by the voltage divider, composed of resistors 133 and 134, to the grid 129 cuts off the tube 122, since the current drawn by the tube 121, passing through common cathode resistor 143, acts to raise the potential of the cathode 137 sufficiently to introduce a cut-off voltage between grid 129 and cathode 137 of the tube 122. If a negative pulse is now applied to the grid 128 of sufficient voltage to cut off the tube 121, its plate voltage will rise, resulting in an increase in the voltage of grid 129 so the tube 122 will begin to conduct. When this occurs, the voltage of plate 124 of the tube 122 drops and the reduced voltage applied from the plate 124 to the grid 128 of the tube 121 maintains the tube 121 in cut-off condition, although the negative pulse is immediately removed from the grid 128. The circuit will remain in this condition until the tube 122 is cut off as by the application of a negative pulse to its grid 129.

The grids 128 and 129 of the tubes 121 and 122 are also connected to leads 116 and 115, respectively, which supply signals from switch contactors 106 and 105 to the switching tubes 121 and 122, respectively.

When the switch contactors 105 and 106 are set, as shown in Fig. 3, output signals from the selector tubes 57 and 58 are supplied to the grids 129 and 128 of the tubes 122 and 121, respectively. If the receiver is located at the point 14 (Fig. 1), signals from the transmitting stations 11, 12 and 13 are received in the sequence shown at A', B', and C', of Fig. 2, and output signals are produced corresponding to negative pulses 97, 98 and 99, shown at A'', B'', and C'', in Fig. 2.

A negative pulse corresponding to the output signal 97 will first be supplied from selector 57 through switch 101 to cut-off tube 122, and then a negative pulse, corresponding to output signal 98 will be supplied from selector tube 58 through switch 102 to cut-off tube 121 at which time the tube 122 will begin to conduct. The measuring circuit will remain in this condition until another output signal from the selector tube 57, corresponding to the reception of a later group of pulses 21 from the transmitting station 11, cuts off the tube 122 and the tube 121 begins to conduct.

It will be apparent that current flows through the winding 138 of the differential meter 141 for a time interval proportionate to the time interval between signals 97 and 98 from the selector tubes 57 and 58, respectively, whereas current will flow through the winding 139 for a time interval proportionate to the time interval between signal 98 from the selector tube 58, and a subsequent signal 97' from the selector tube 57 which corresponds to the reception of a later group of pulses from the transmitting station 11.

Since the pointer 142 is responsive to the difference in the currents through 138 and 139, it will be deflected in a direction dependent upon whether signals from transmitting station 11 or transmitting station 12 are first received by receiver 32. Full scale deflection of the needle will be obtained when the signals from the two stations are received substantially simultaneously, because, under these conditions one of the tubes will conduct current for only a very short interval, and in the case of simultaneous reception of the signals should not conduct at all.

However, as the time interval between signals, received from different stations increases the magnitude of the deflection of the pointer 138 is reduced until it reaches a central position. This will occur when the time interval between the reception of the signals from the two stations is equal to one-half of the time period between successive groups of pulses transmitted by the stations. For this reason it is desirable to have the period of radiation of groups of pulses such that the time between successive groups will be slightly more than double the time difference for the reception of signals from two of the stations in the most extreme position of the craft that can be anticipated. If desired the circuit of the meter may be modified so the magnitude of the deflection of the needle 142 will be directly instead of inversely proportional to the difference in the distances to the two stations.

As already stated the circuit of the measuring device 112 is identical with that of 111. Leads 117 and 118 supply signals to the grids 128' and 129' of the tubes 121' and 122'. When the contactors 107 and 108 are set as shown in Fig. 3, the measuring device 112 responds to the difference in the distances of the receiver from transmitting stations 12 and 13, since contactor 108 connects selector tube 58 to the measuring device, and contactor 107 connects selector tube 59 thereto.

The differential currents through windings 138' and 139' of differential meter 141', as determined by the time interval between the reception of signals from transmitting stations 12 and 13, deflect pointer 142' to indicate the difference in the distances of the pointer 114 from the stations 12 and 13. The direction of the deflection of the needle 142' indicates whether a signal from the station 12 or that from station 13 is received first.

Contactors 105 and 106 may be set to connect any pair of the selector tubes 57, 58 and 59 to the measuring device 111 to thereby indicate the difference in the distances of the receiver from any two of the transmitting stations 11, 12, and 13. As shown in the drawings the measuring device 111 provides a measure of the difference in the distances of the receiver, and the craft, from the stations 11 and 12. This distance is indicated by the position of needle 142 to thereby locate a craft on one of the branches 15 or 16 of a hyperbola. The particular branch 15 is determined by the direction of the deflection of the needle 142.

Contactors 107 and 108 of the switches 103 and 104 may likewise be set to connect the output of any two of the selector tubes 57, 58 or 59 to the measuring device 112. In this manner the switches may be set so the measuring device 112 will provide a measure of the difference in the distances of the craft from any two of the transmitting stations 11, 12 or 13, thereby locating the craft on a particular hyperbola. As shown in Fig. 3, the switches 103 and 104 supply signals from selector tubes 58 and 59, to the measuring device 112, which therefore provides a measure of the difference in the distances of the receiver 32 from the transmitting stations 12 and 13. The direction of the deflection of the needle 142' indicates that the signals from station 13 are received first, thereby locating the craft on branch 18 of the hyperbola.

In operation the contactors 47, 48 and 49 may be adjusted to supply inputs for selector tubes 57, 58 and 59 which will identify any three selected stations, of which there may be a great number located throughout the world. Signals from these three stations 11, 12, and 13 are identified and segregated by selector tubes 57, 58 and 59 respectively so the outputs of these tubes correspond only to the reception of signals from the particular station for which their inputs are set.

The two measuring devices 111 and 112 have their inputs connected through switches which may be set to supply output signals from any two of the selector tubes to their respective measuring devices. These devices then provide a measure in the difference in the distances of the receiver from the two selected transmitting stations which actuate each of them. With this information it is possible to identify the hyperbolas defined by the distance differences and also to identify the particular branch of said hyperbolas on which the craft is located. Since two branches are identified their intersection fixes the position of the craft. This automatic identification of branches of two hyperbolas on which the craft is located, enables a navigator to readily locate the intersection of the two identified branches of the hyperbolas on a map which may be provided with families of hyperbolas for various pairs of transmitting stations as suggested above.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a radio navigation system for a mobile craft, apparatus for determining the difference in the distances between said craft and a pair of transmitting stations radiating spaced pulses of electromagnetic energy comprising a receiver, a pair of selectors connected to said receiver and responsive to the spacing of transmitted pulses for segregating pulse signals of each of said transmitting stations from other received signals, and current reading means actuated by said selectors for providing a measure of the difference in the distances of said craft from said transmitting stations.

2. In a radio navigation system for a mobile craft, apparatus for determining the difference in the distances between said craft and a plurality of transmitting stations radiating spaced pulses of electromagnetic energy comprising a receiver, a plurality of selectors connected to said receiver and responsive to the spacing of transmitted pulses for segregating the pulses of each of said stations from other received signals, means responsive to a pair of said selectors for providing a measure of the difference in the distances of said craft from a pair of said transmitting stations, and a switch for selectively connecting said means to any pair of said selectors for measuring the distance difference to any pair of said transmitting stations.

3. In a radio navigation system for a mobile craft, apparatus for determining the difference in the distances between said craft and a plurality of transmitting stations radiating spaced pulses of electromagnetic energy comprising a receiver, a plurality of selectors connected to said receiver and responsive to the spacing of transmitted pulses for segregating pulses of each of said stations from other received pulses, each of said selectors having settable means for adjusting it to respond to the signals from a specific station, means adapted to be actuated by a pair of said selectors for providing a measure of the difference in the distances of said craft from a pair of said transmitting stations, and a switch for selectively connecting said means to any pair of said selectors for measuring the distance difference to any pair of said transmitting stations.

4. In a radio navigation system having a plurality of separated stations for transmitting groups of differently spaced signal pulses, said groups having the same periodicity, apparatus for identifying the pulses of each station comprising a receiver and a plurality of selectors connected to said receiver and responsive to the spacing of said pulses for segregating the signal pulses of each of said stations from other received signals.

5. In a radio navigation system having a plurality of separated stations for transmitting groups of differently spaced pulses, said groups having the same periodicity, apparatus for identifying the pulses of each station comprising a receiver and a plurality of selectors connected to said receiver and responsive to the spacing of said pulses for segregating the pulse signals of each of said stations from other received signals, each of said selectors having a settable means for adjusting it to respond to the spaced pulses from a specific station.

6. In a radio navigation system having a plurality of separated stations for transmitting groups of differently spaced pulses, said groups having equal periodicity, apparatus for determining the position of a mobile craft comprising a receiver, a plurality of selectors connected to said receiver responsive to the spacing of said pulses for segregating pulses of each of said stations from other received pulses, and current reading means actuated by said selectors for providing a measure of the difference in the distances of said craft from a pair of stations.

7. In a radio navigation system having a plurality of separated stations for transmitting groups of differently spaced pulses, said groups having equal periodicity, apparatus for determining the position of a mobile craft comprising a receiver, a plurality of selectors connected to said receiver responsive to the spacing of said pulses for segregating pulses of each station from other received pulses, and current reading means actuated by different pairs of said selectors for determining the difference in the distances of said craft from corresponding pairs of said stations.

8. In a radio navigation system having a plurality of separated stations for transmitting groups of differently spaced pulses, said groups having equal periodicity, apparatus for determining the position of a mobile craft comprising a receiver, a plurality of selectors connected to said receiver responsive to the spacing of said pulses for segregating the pulses of each station from other received pulses, means responsive to a pair of said selectors for determining the difference in the distances of said craft from a pair of said transmitting stations and an indicator actuated by said means for indicating said distance differences.

9. In a radio navigation system having a plurality of separated stations for transmitting groups of differently spaced pulses, said groups having equal periodicity, apparatus for determining the position of a mobile craft comprising a receiver, a plurality of selectors connected to said receiver responsive to the spacing of said pulses for segregating the pulses of each station from other received pulses, separate means connected to different pairs of said selectors for determining the difference in the distances of said craft from certain pairs of said transmitting stations, and indicators actuated by each of said means for indicating said distance differences and the nearest station of each of said pairs.

10. In a radio navigation system for a mobile craft, apparatus for automatically providing data for locating the craft by the intersection of branches of two hyperbolas having as their foci a plurality of stations for synchronously transmitting a plurality of differently spaced pulses comprising a receiver, a plurality of selectors connected to said receiver and responsive to the spacing of said pulses for segregating pulses of each of said transmitting stations from other received pulses, and means actuated by pairs of said selectors for automatically determining branches of said hyperbolas on which said craft is located.

11. In a radio navigation system for a mobile craft, apparatus for automatically providing data for locating the craft by the intersection branches of two hyperbolas having as their foci a plurality of stations for synchronously transmitting a plurality of differently spaced pulses comprising a receiver, a plurality of selectors connected to said receiver and responsive to the spacing of said pulses for segregating pulse signals of each of said transmitting stations from other received pulses, means actuated by pairs of said selectors for automatically determining branches of said hyperbolas on which said craft is located, and indicating means actuated by said last-named means for identifying said branches of the hyperbolas whose intersection fixes the location of said receiver.

12. In a radio navigation system having a pair of separated stations for synchronously transmitting a plurality of differently spaced pulses, current reading apparatus for identifying the pulses of each station comprising a receiver and a pair of selectors connected to said receiver and responsive to the spacing of said pulses for segregating pulses of each of said stations from other received pulses.

13. In a radio navigation system having a pair of stations transmitting a plurality of differently spaced pulses, apparatus for determining the difference in the distances between a mobile craft and said stations comprising a pair of selectors at said craft responsive to the spacing of said pulses for segregating pulses of each of said stations from other received pulses, and means actuated by said selectors for providing a measure of the difference in the distances of said craft from said stations.

14. In a radio navigation system having a pair of stations transmitting a plurality of differently spaced pulses, apparatus for determining the difference in the distances between a mobile craft and said stations comprising a pair of selectors at said craft responsive to the spacing of said pulses for segregating pulses of each of said stations from other received signals, means actuated by said selectors for determining the difference in the distances of said craft from said transmitting stations, and an indicator responsive to said means for indicating said difference.

ERIC J. ISBISTER.

REFERENCES CITED

The following references are of record in the file of this patent:

UNITED STATES PATENTS

| Number | Name | Date |
|---|---|---|
| 2,144,203 | Shanklin | Jan. 17, 1939 |
| 2,198,113 | Holmes | Apr. 23, 1940 |
| 2,199,634 | Koch | May 7, 1940 |
| 2,204,438 | Neufeld | June 11, 1940 |
| 2,266,401 | Reeves | Dec. 16, 1941 |
| 2,328,944 | Beatty | Sept. 7, 1943 |
| 2,403,600 | Holmes | July 9, 1946 |
| 2,406,970 | Smith | Sept. 3, 1946 |